United States Patent
Bucceri

(10) Patent No.: US 10,758,810 B2
(45) Date of Patent: Sep. 1, 2020

(54) TRAINING APPARATUS AND METHOD FOR TEACHING AND PRACTICING SKILLS FOR SPORTS

(71) Applicant: Alfio Bucceri, Brisbane (AU)

(72) Inventor: Alfio Bucceri, Brisbane (AU)

( * ) Notice: Subject to any disclaimer, the term of this patent is extended or adjusted under 35 U.S.C. 154(b) by 0 days.

(21) Appl. No.: 16/318,004

(22) PCT Filed: Aug. 28, 2017

(86) PCT No.: PCT/AU2017/050914
§ 371 (c)(1),
(2) Date: Jan. 15, 2019

(87) PCT Pub. No.: WO2018/035581
PCT Pub. Date: Mar. 1, 2018

(65) Prior Publication Data
US 2019/0344149 A1    Nov. 14, 2019

(30) Foreign Application Priority Data

| | | |
|---|---|---|
| Aug. 26, 2016 | (AU) | 2016903416 |
| Sep. 8, 2016 | (AU) | 2016903612 |
| Sep. 14, 2016 | (AU) | 2016903694 |
| Feb. 27, 2017 | (AU) | 2017900665 |
| Mar. 19, 2017 | (AU) | 2017900959 |

(Continued)

(51) Int. Cl.
*A63B 71/06* (2006.01)
*A63F 7/30* (2006.01)
(Continued)

(52) U.S. Cl.
CPC ............ *A63B 71/0622* (2013.01); *A63F 7/30* (2013.01); *A63B 69/0086* (2013.01);
(Continued)

(58) Field of Classification Search
CPC ......... A63B 69/00; A63B 57/00; A63B 67/02; A63B 69/36; A63B 63/00
See application file for complete search history.

(56) References Cited

U.S. PATENT DOCUMENTS

| | | | |
|---|---|---|---|
| 3,797,833 A | * 3/1974 | Rokusek | A63B 57/357 473/180 |
| 5,505,452 A | * 4/1996 | Meaden | A63B 69/3691 473/154 |

(Continued)

FOREIGN PATENT DOCUMENTS

| | | |
|---|---|---|
| DE | 4100073 A1 | 7/1992 |
| GB | 2271724 A | 4/1994 |
| WO | 2005058436 A2 | 6/2005 |

*Primary Examiner* — Eugene L Kim
*Assistant Examiner* — Christopher Glenn
(74) *Attorney, Agent, or Firm* — Hudak, Shunk & Farine Co. LPA

(57) ABSTRACT

A training apparatus for teaching and practicing skills for sports. The apparatus includes at least one removable electronic device having at least one proximity sensor, a playing surface having a cavity which receives the at least one removable electronic device, and a gamepiece, such as a ball. Each proximity sensor is adapted to sense the gamepiece and activates a visual or audio indicator on the at least one removable electronic device if the gamepiece is within a range of the at least one proximity sensor.

22 Claims, 8 Drawing Sheets

(30) Foreign Application Priority Data

| | | |
|---|---|---|
| Mar. 23, 2017 | (AU) | 2017901042 |
| Mar. 25, 2017 | (AU) | 2017901078 |
| Apr. 7, 2017 | (AU) | 2017901298 |
| May 8, 2017 | (AU) | 2017901701 |
| May 29, 2017 | (AU) | 2017902034 |
| Aug. 16, 2017 | (AU) | 2017903277 |

(51) Int. Cl.
　　*A63B 69/00*　　(2006.01)
　　*A63F 7/00*　　(2006.01)
　　*A63F 7/06*　　(2006.01)

(52) U.S. Cl.
　　CPC ....... *A63B 2209/00* (2013.01); *A63B 2220/89* (2013.01); *A63B 2225/50* (2013.01); *A63F 7/0023* (2013.01); *A63F 7/0616* (2013.01); *A63F 7/0632* (2013.01); *A63F 2007/3045* (2013.01); *A63F 2250/183* (2013.01)

(56) References Cited

U.S. PATENT DOCUMENTS

| | | | | |
|---|---|---|---|---|
| 5,626,526 A * | 5/1997 | Pao | A63B 24/0021 | 473/152 |
| 2002/0107080 A1 * | 8/2002 | Hsu | A63B 67/02 | 473/191 |
| 2004/0005933 A1 * | 1/2004 | Maruszczak | A63B 24/0021 | 473/192 |
| 2010/0171262 A1 * | 7/2010 | Sells | A63B 69/3694 | 273/108.2 |
| 2011/0054782 A1 * | 3/2011 | Kaahui | A63B 69/3608 | 701/532 |
| 2011/0201437 A1 * | 8/2011 | Fallow | A63B 24/0021 | 473/152 |
| 2011/0256945 A1 * | 10/2011 | Hsiang | A63B 63/00 | 473/194 |
| 2012/0289354 A1 * | 11/2012 | Cottam | A63B 69/3658 | 473/223 |
| 2013/0095725 A1 * | 4/2013 | Von Mohr | A63H 3/48 | 446/321 |
| 2013/0102419 A1 * | 4/2013 | Jeffery | A63B 24/0006 | 473/409 |
| 2014/0243118 A1 * | 8/2014 | Weston | A63B 63/004 | 473/470 |
| 2014/0349786 A1 * | 11/2014 | Melin | A63B 69/002 | 473/446 |
| 2015/0080142 A1 * | 3/2015 | Kline | A63B 71/0622 | 473/221 |
| 2015/0190094 A1 * | 7/2015 | Lee | A63B 5/02427 | 600/479 |
| 2015/0195397 A1 * | 7/2015 | Rice | H04M 1/72527 | 345/619 |
| 2015/0231460 A1 * | 8/2015 | Pringle | A63B 57/00 | 340/568.6 |
| 2015/0283443 A1 * | 10/2015 | Dunser | A63B 69/002 | 473/446 |
| 2015/0290512 A1 * | 10/2015 | Montgomery | A63B 67/06 | 473/570 |
| 2017/0285778 A1 * | 10/2017 | Liang | G06K 9/00053 | |

* cited by examiner

TRAINING APPARATUS AND METHOD FOR TEACHING AND PRACTICING SKILLS FOR SPORTS

FIELD OF THE INVENTION

The invention relates to an apparatus and method for teaching and practicing skills for sports. In particular, the invention relates, but is not limited, to a training apparatus and method for teaching and practicing skills for sports, such as soccer/football and hockey.

BACKGROUND TO THE INVENTION

Reference to background art herein is not to be construed as an admission that such art constitutes common general knowledge.

Soccer (also widely known as football in many countries), is a very popular sport for people to both play and watch. The final of the 2014 FIFA World Cup alone had over 1 billion viewers and FIFA estimates that there are over 270 million active participants in the game of soccer. However, with the increased urbanisation, high-rise living of many in inner-city areas and increasingly busy schedules, adequate time and space for practicing the skills necessary to excel in the sport, can be difficult to organise for many people, including those with young children just beginning to play and grow their interest in soccer. Soccer fields, and sports ovals in general, which are usually necessary for practice, take up large amounts of space and may not be easily accessible.

OBJECT OF THE INVENTION

It is an aim of this invention to provide a training apparatus and method for teaching and practicing skills for sports which overcomes or ameliorates one or more of the disadvantages or problems described above, or which at least provides a useful alternative.

Other preferred objects of the present invention will become apparent from the following description.

SUMMARY OF THE INVENTION

In one form, although it need not be the only or indeed the broadest form, there is provided a training apparatus for teaching and practicing skills for sports comprising:
at least one removable electronic device having at least one proximity sensor;
at least one playing surface having a cavity which receives the at least one removable electronic device; and
a gamepiece,
wherein each proximity sensor is adapted to sense the gamepiece and activates a visual or audio indicator on the at least one removable electronic device if the gamepiece is within a range of the at least one proximity sensor.

Preferably, the at least one removable electronic device is a smartphone or tablet computer.

Preferably, the playing surface includes a plurality of cavities for receiving additional removable electronic devices.

Preferably, the apparatus comprises two or more playing surfaces, each playing surface one or more cavities for receiving removable electronic devices.

Preferably, the apparatus comprises two or more removable electronic devices, each having at least one proximity sensor.

Preferably, the two or more removable electronic devices are each received in one of the one or more cavities of the playing surface. Preferably, the two or more removable electronic devices are each received in a cavity of one of the two or more playing surfaces.

Preferably, the two or more electronic devices are networked. More preferably, the two or more electronic devices are networked using a wireless local area network, Bluetooth, infrared sensors or a cellular network.

Preferably, the two or more electronic devices wirelessly communicate proximity sensor data to each other.

Preferably, the apparatus further comprises:
A least one substantially vertical support member;
a horizontal mounting member extending from the at least one vertical support member; and
a movable member attached to the horizontal mounting member, wherein an end of the movable member is adjacent the proximity sensor of the electronic device, wherein the at least one proximity sensor senses the movable member and activates a visual or audio indicator if the gamepiece moves the movable member.

Preferably, the gamepiece is a ball or puck.

Preferably, upon sensing the gamepiece in the range of the at least one proximity sensor, the electronic device calculates a score.

Preferably, the proximity sensor is an infrared proximity sensor.

Preferably, the playing surface is a quadrilateral shaped mat or a circular or oval shaped mat for holding the removable electronic device. More preferably, the playing surface is a square or rectangular mat.

Preferably, the playing surface has at least one bevelled edge or sloping edge. Preferably, the angle of the bevelled or sloping edge is between about 5° to 65°. More preferably, the angle is between about 25° to 55°. Even more preferably, the angle is between about 35° to 45°. In particularly preferred embodiment, the angle is about 45°.

Preferably, the movable member is a piece of material suspended from the horizontal mounting member. More preferably, an end of the material is located adjacent the proximity sensor. Preferably, a second movable member is attached to the horizontal mounting member. Preferably, an end of each of the movable members is located on opposites sides of and adjacent to the proximity sensor.

Preferably, the movable member comprises an end having two opposing detecting portions located adjacent the proximity sensor.

Preferably, the playing surface includes at least one member biased to extend substantially vertically from the base of the playing surface. Preferably, the playing surface includes between 1 and 4 members biased to extend substantially vertically from the base of the playing surface. Preferably, the members are located along a periphery of the playing surface. Preferably, at least one member extends from an edge of the base of the playing surface. More preferably, the playing surface includes two members located on opposite edges of the playing surface. Even more preferably, a member is located on each edge of the quadrilateral mat.

Preferably, a member is configured to move to a substantially horizontal position which activates the proximity sensor of the removable electronic device when the gamepiece contacts the member. More preferably, the member is configured to return to a vertical position once the gamepiece is no longer in contact with the member.

Preferably, a goal is located along an edge of the playing surface. More preferably, the goal has two vertical members positioned a distance apart. More preferably, a net is supported between the two vertical members of the goal. Even more preferably, a horizontal member extends from and between distal ends of the two vertical members relative to the playing surface.

Preferably, a backboard or stop member is located along an edge of the recess of the playing surface. Preferably, the stop member extends vertically from the edge of the playing surface.

Preferably, the playing surface comprises plastic or foam.

Preferably, the playing surface includes a securing device for securing the playing surface to a surface, such as the ground or a tabletop. More preferably, the securing device includes suction cups or stakes.

Preferably, a covering device is received within the at least one cavity of the playing surface over the removable electronic device to protect a screen of the removable electronic device. Preferably, the covering device covers a portion of the screen of the removable electronic device. More preferably, the cover does not cover the proximity sensor of the removable electronic device. More preferably, the covering device is a clear cover. Even more preferably, the covering device is a clear, plastic cover.

Preferably, the apparatus further comprises a wall extending vertically from an edge of the playing surface, the wall having an opening for allowing a gamepiece to pass through the opening.

In another form, the invention resides in a method for teaching and practicing skills for sports, the method comprising the steps of:
  inserting a removable electronic device having at least one proximity sensor into a cavity of a playing surface;
  actuating a gamepiece to activate a visual or audio indicator on the at least one removable electronic device if the gamepiece is within a range of the at least one proximity sensor.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
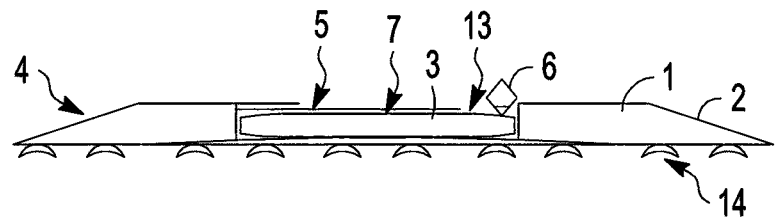
FIG. 1 illustrates a side view of a training apparatus for teaching and practicing skills for soccer in accordance with an embodiment of the present invention.
Figure 2:
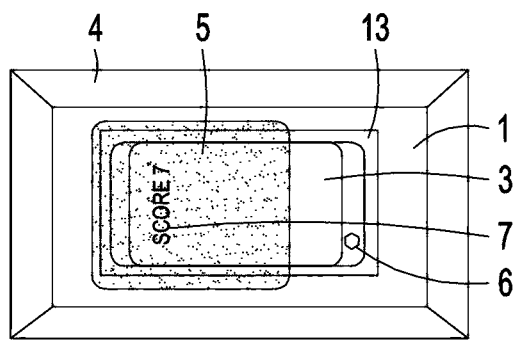
FIG. 2 illustrates a top view of the training apparatus shown in FIG. 1.

The following detailed description relates to a preferred embodiment of the invention illustrated in the drawings, and it should be appreciated that it is not to be regarded as limiting.

FIG. 1 illustrates a side view of a training apparatus 1 for teaching and practicing skills for soccer. The apparatus 1 includes a playing surface in the form of a mat 2 which receives and secures a removable electronic device in the form of a smartphone 3 (the removable electronic device could also be in the form of a mobile phone, tablet computer or specially programmed device, i.e. a dedicated proximity sensing device, which are not shown) for play in a cavity 13. The cavity 13 allows the smartphone 3 to sit level with the top surface of the mat 2 to allow the gamepiece, which can be in the form of a ball or puck, to roll freely across the top surface thereby allowing the target (being the proximity sensor 6 on the phone 3) to be activated and to protect the smartphone 3 (or tablet or similar device) from being damaged in use.

The mat 2 can be formed from rubber, foam, plastic, timber, cardboard, water filled plastic, fibreglass or any material suitable for holding and protecting a device from substantial impact when a ball or similar object rolls over the device.

In some embodiments, the mat 2 includes suction pads 14, similar to those used on bathroom mats, which secure the mat 2 to a surface, such as a table or the ground, and limits or eliminates movement of the mat 2 during play or practice. It will be appreciated by a person skilled in the art that the suction pads 14 can be replaced with another suitable securing device, such as Velcro strips (shown in FIG. 3) or stakes (shown in FIG. 4).

As mentioned above, the smartphone 3 includes a proximity sensor 6 which is left exposed when the smartphone is positioned within the cavity 13 of the mat 2. In the illustrated embodiment, the smartphone 3 only has a single proximity sensor 6. However, it will be appreciated that the smartphone 3 can have multiple proximity sensors.

The smartphone 2 is held in place within the cavity 13 by a clear plastic cover 5 which covers a portion of the screen 7 of the smartphone 3. This plastic cover 5 both secures the smartphone 3 within the cavity 13 and allows the screen 7 of the smartphone 3 to be viewed by a user while also protecting the screen 7.

The mat 2, as shown in FIG. 1, includes sloping edges 4, which extend at angle of about 45°, so that the ball can easily move from a surface such as a table, up the sloping edges 4 and onto the mat 2. The sloping edges 4, coupled with the suction pads 14 and the clear plastic cover 5 give the smartphone 3 maximum protection while being used a practice tool or in gameplay.

The smartphone 3 is configured to use the proximity sensor 6 as a target for a variety of skills through an application or program, such as a successful pass or goal in soccer. However, it will be appreciated that the proximity sensor could be used for a variety of skills such as a successful putt in golf, a goal in ice hockey, soccer or handball, a successful pass in football, a strike in baseball, etc.

The application will record the results and give instant feedback by an audio indicator, such as commentary or a sound, or a visual indicator, such as a flashing screen or light, which can be helpful to a player's development.

Figure 3:
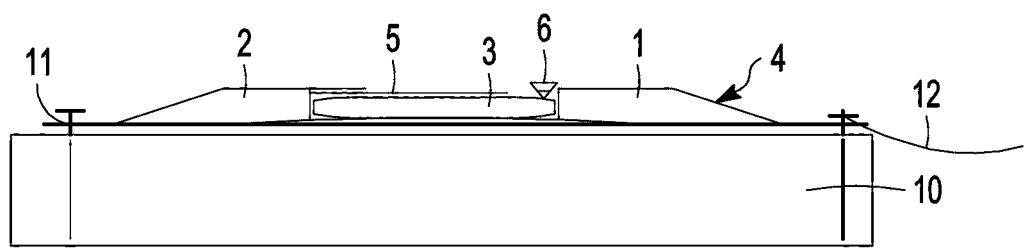
FIG. 3 illustrates a side view of a training apparatus for teaching and practicing skills for soccer in accordance with another embodiment of the present invention.

FIG. 3 illustrates the apparatus 1 being used on a football field 10 or ground where the device holding apparatus 1 can be secured to the ground 10 by stakes 11 or similar means that hold the apparatus 1 securely on the ground 10. For additional safety, the apparatus 1 is also secured by ropes or wires 12 that are connected to each corner of the apparatus 1 to stop the phone holding apparatus 1 from moving during use. The smartphone 3 is always protected during game play or training use by the secure plastic cover 5 and the ball can roll freely over the bevelled edges 4 and over the smartphone 3 to activate the proximity sensor 6 for game play.

In use, the players are prompted by the application regarding the drills and skills to be employed in the practice and the results are recorded. The purpose of the training method is to provide repetitive practice of a drill that is engrained in the sub conscious memory.

Figure 4:
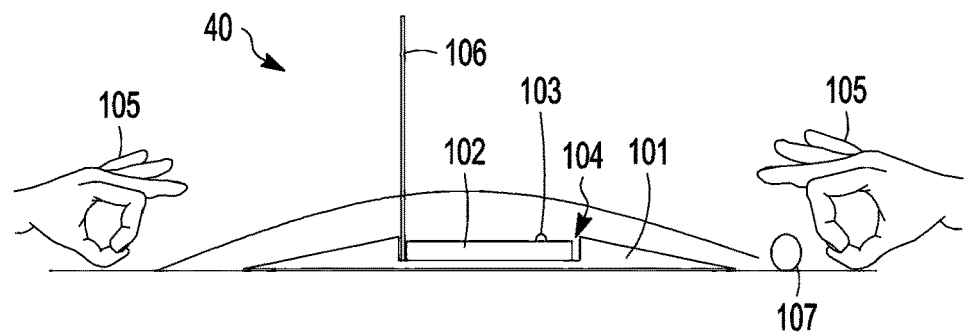
FIG. 4 illustrates a training apparatus with a backboard for teaching and practicing skills for soccer in accordance with another embodiment of the present invention

Turning now to FIG. 4, there is shown a training apparatus 40 having a smartphone holding mat 101 being made of plastic or foam material holding a smartphone 102 in its centre cavity 104 and with a proximity sensor 103 exposed in the corner of the smartphone 102. The player(s) 105 flick the ball 107 with their fingers across the training apparatus 40 where a goal can be recorded by an application installed on the smartphone 102 if it crosses the path of the proximity sensor 103.

The apparatus 40 also includes a backboard 106 mounted along an edge of the cavity 104 where the ball 107 is returned after each shot at goal.

In use, 2 players 105 (although it could be one player or more than 2 players), play the game or practice by flicking the ball 107 by passing and shooting to each other or, in the instance of a single player flicking the ball 107 against the backboard 106. In an example of a simple training sequence, the ball 107 is passed to the right from one player 105 to another player 105, the ball 107 is then returned to the player 105 making the pass who then attempts to shoot at the goal (being the proximity sensor 103) with the smartphone application recording a result and also allocating set times to perform the pass drill.

In some embodiments, a purpose-built table (not shown) can be used to have up to 4 players playing on each side of the table.

Figure 5:
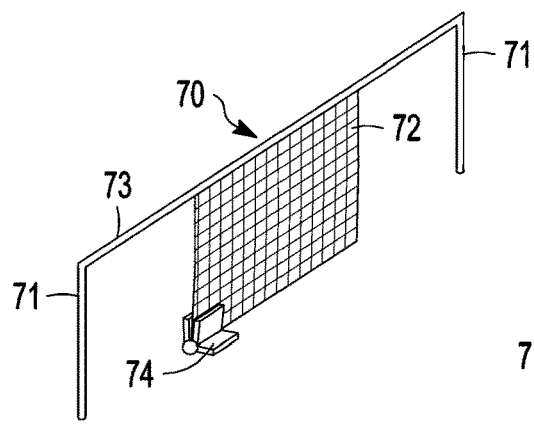
FIG. 5 illustrates a training apparatus for teaching and practicing skills for soccer in accordance with another embodiment of the present invention.

In FIG. 5, a net system 70 is shown with a freely moving net 72 suspended between two upright supporting members in the form of two upright poles 71 on a horizontal suspension member in the form of a pole 73. In use, the net 72 is suspended above or adjacent the proximity sensor of the smartphone as described above. The net 72 is made of a light weight fabric or plastic that can be connected to the pole 73, draped over the pole 73 or connected directly to the upright horizontal poles 71. The net 72 acts as a visual reference for a soccer goal, goal posts, or any form of target associated with a game that is being taught.

In use, the net 72 will freely be moved backward when impacted with a strike such as a kick from a ball, throw of a ball or punch of a ball and, in doing so, can activate a proximity sensor as previously described that forms part of the hardware of a mobile phone or standalone proximity sensor device.

In play or practice, the net 72 moves past the proximity sensor of the smartphone and activates the proximity sensor when a ball impacts the net 72 to record a successful outcome of the strike in the teaching program.

In FIG. 5, the net 72 is shown to have an extended right angled device 74 attached at the bottom of the net 72, which acts as a proximity sensor activator. This right angled device 74 serves to increase the surface area of the portion of the net that will travel over the proximity sensor of the smartphone described above.

The target area or range of the proximity sensor can be adjusted, expanded and made bigger by using the net system 70 that can also trigger the proximity sensor as previously described above, where a ball hits the net 72 that moves across the proximity sensor of a device to record the result.

Figure 6:
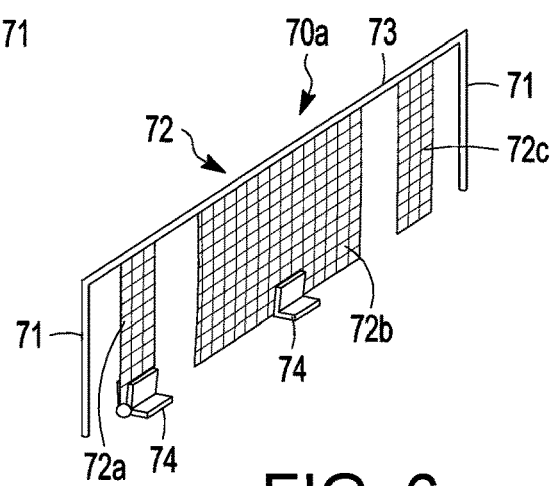
FIG. 6 illustrates a training apparatus for teaching and practicing skills for soccer in accordance with another embodiment of the present invention.

FIG. 6 shows another variation of a net system 70a, similar to the net system 70 described in FIG. 5 where a net 72 is broken into 3 movable net sections 72a, 72b, 72c whereby only one area of the net system 70a will be moved forward when struck a blow by a ball. A net system 70a such as this can be used in training to provide different targets for use and for the target zone to be made as small as possible to increase a user's skill. For example, in the event a soccer ball only strikes one of the side panels 72a, 72c, this would register a backward movement of the net (assuming proximity sensors were adjacent these side panels 72a, 72c) and therefore a successful strike, whereas a strike in the centre net 72b would not register a strike unless the centre piece 72b were the target area.

There are also two right angled devices 74, substantially as described with regard to right angled device 74 in FIG. 5.

Figure 7:
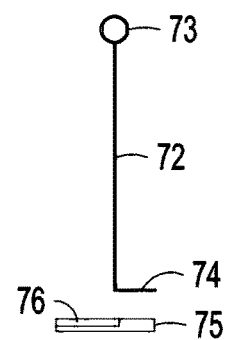
FIG. 7 illustrates a side view of the training apparatus illustrated in FIG. 6.

FIG. 7 shows the apparatus 70 set up for use in a side view. The net 72 is hung from a rope or pole 73 and the proximity sensor activator 74 is connected at the base to swing over the proximity sensor holding device 75 that holds the proximity sensor in the smartphone 76.

Figure 8:
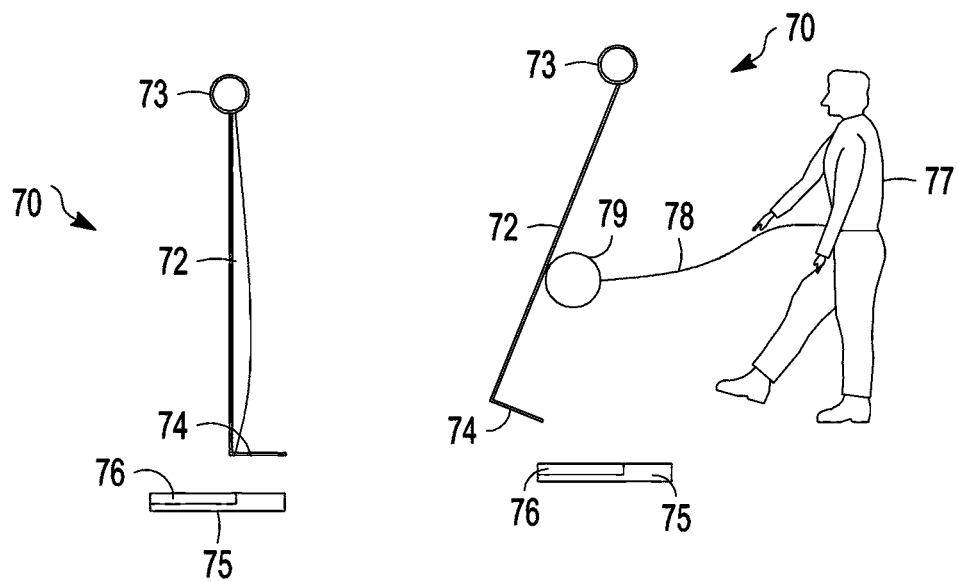
FIG. 8 illustrates a side view of the training apparatus of FIGS. 6 and 7 in use.

FIG. 8 shows the apparatus 70 as used by a player 77 kicking a ball 79 attached to an optional string 78 in the drawing on the left, the net 72 is in a natural hanging position and sits over the proximity sensor 76. The drawing on the right shows the result of an impact with the ball 79 on the net 72 whereby the proximity sensor activator 74 or the net alone 72 moves across the path of the proximity sensor 76 and a strike or goal is recorded. The proximity sensor in the smartphone 76 then provided the feedback to an application on the smartphone 76 to record the results or make use of the data for training purposes or games. After the net 72 moves backwards with the strike, the net 72, the ball 79 and the elasticised string 78 return back to their original position for reuse by the user 77.

Figure 9:
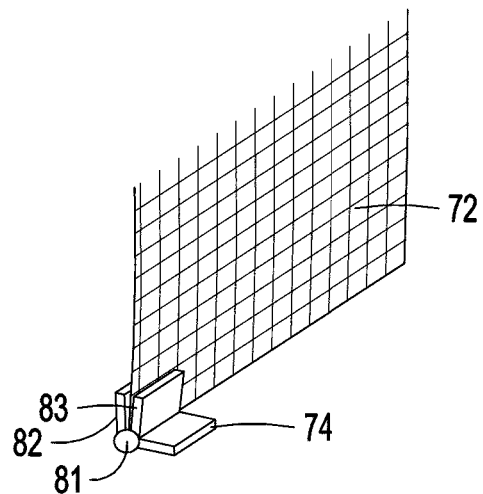
FIG. 9 illustrates a net attachment for a training apparatus as described herein.

FIG. 9 shows a multi positional proximity sensor activator 74 that is movable anywhere on the net 72 so it is positioned to move 0.1 cm to 8 cm over the top of the proximity sensor device (not shown). The activator 74 is sufficiently wide and deep to completely cover the proximity sensor and the net 72 alone can also serve the same purpose. The proximity sensor activator 74 can be sewn onto the fabric of net 72, be applied by glue, be clipped on, or be clamped on as shown with a spring latch mechanism with latches 83 and 82 connected to a spring 81. In this way the activator 74 can be moved anywhere and in any position on the net 72 to create different locations for targets for the user.

Figure 10:
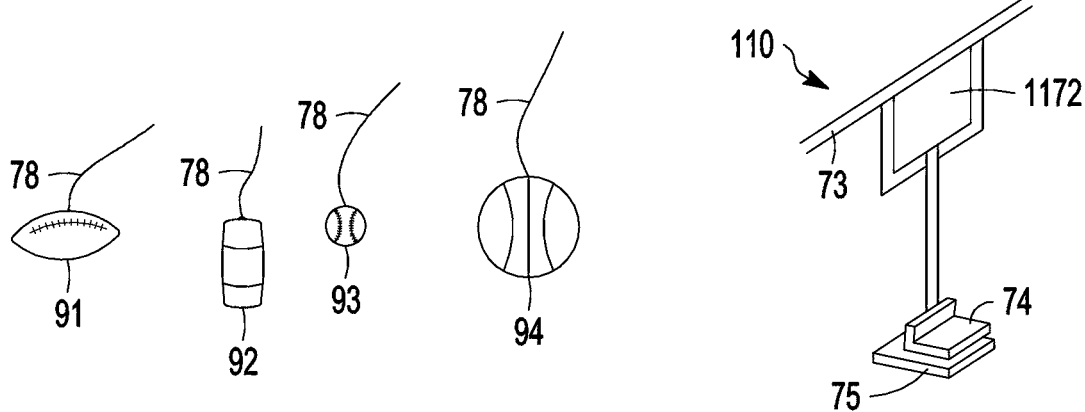
FIG. 10 illustrates attachments for a training apparatus described herein.

FIG. 10 shows some of the varying instruments that could be attached to a retractable cord 78 such as but not limited to an oval football 91, boxing ball 92, cricket ball, baseball, hockey, bowling ball (93) and football or basketball 94. In each case the item can be propelled at a net target that can be propelled backwards with force to activate a strike or goal.

Figure 11:
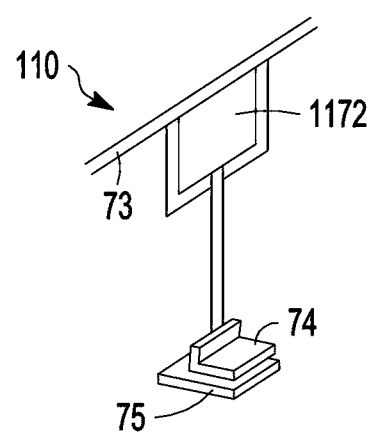
FIG. 11 illustrates a goal attachment for a training apparatus as described herein.

FIG. 11 shows an alternative embodiment of a training apparatus 110 that can be created where the net 1172 forms a goal for American football such that the strike would need to occur on the higher face of the net and the result being that the narrow, bottom part of the net 1172 moving the proximity sensor activator 74 over the proximity sensor device 75.

Figure 12:
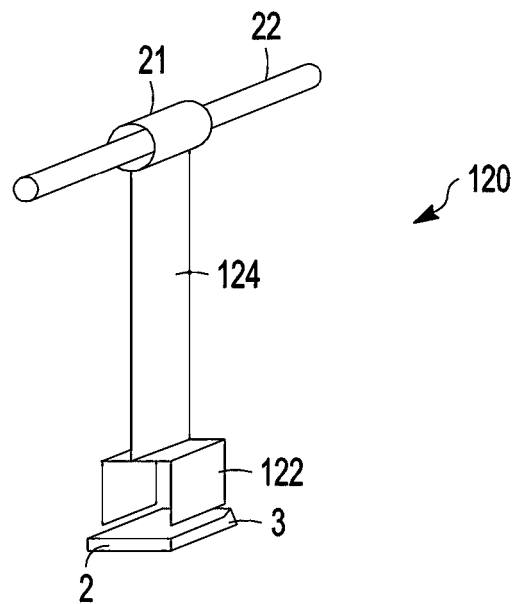
FIG. 12 illustrates a perspective view of a double sided net attachment for a training apparatus as described herein.

FIG. 12 shows another embodiment of a training apparatus 120 including a tethering device 124 which is connected to a pole 22 which is connected through the rings 21 so that the tethering device 124 will swing back and forth when it is struck a blow.

The tethering swinging device 124 is connected to the target hovering device in the form of a double sided net 122 which swings over the smartphone 3 with cavity 13 of holding device 2. The device 122 in this form can be made in one piece for use and can have targets such as a net connected to each side of the apparatus 120.

Figure 13:
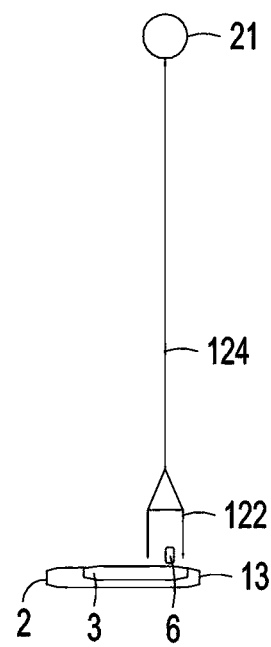
FIG. 13 illustrates a side view of the double sided net attachment illustrated in FIG. 12.

FIG. 13 shows a side view of the training apparatus 120. It can be seen from the illustration that the net 122 sits slightly above the mobile phone 3 and that each side of the net 122 is positioned beside the proximity sensor 6 of smartphone 3.

Figure 14:
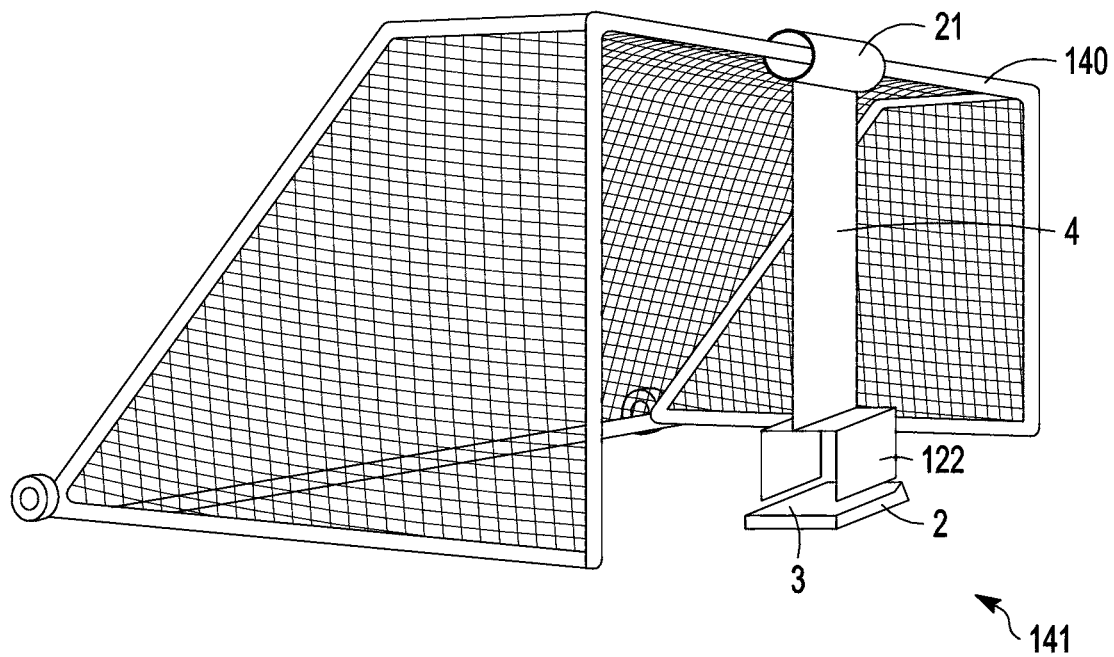
FIG. 14 illustrates the double sided net attachment of FIG. 12 attached to a set of soccer goals.

FIG. 14 illustrates a use of the apparatus 120 where the double sided net 122 is attached to a soccer goal 140 on a playing field and the mat is placed beneath the double net apparatus on the field.

Figure 15:
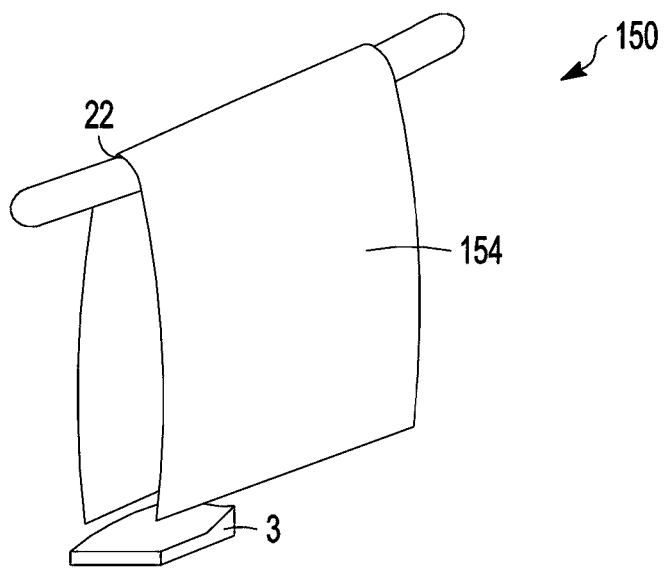
FIG. 15 illustrates a perspective view of another double sided net attachment for a training apparatus as described herein.

Referring now to FIG. 15, there is shown a further embodiment of a training apparatus 150 where a twin net of fabric, cardboard or composite material 154 hovers over the smart phone 3 and is connected to a pole or holding device 22. As the net 154 swings in any direction it will activate the proximity sensor of the smartphone 3.

The twin net 154 with 2 or more sides can be configured in many ways and can be fabricated from most materials including metal, plastics wood, fabrics composites and be in many shapes and forms.

Figure 16:
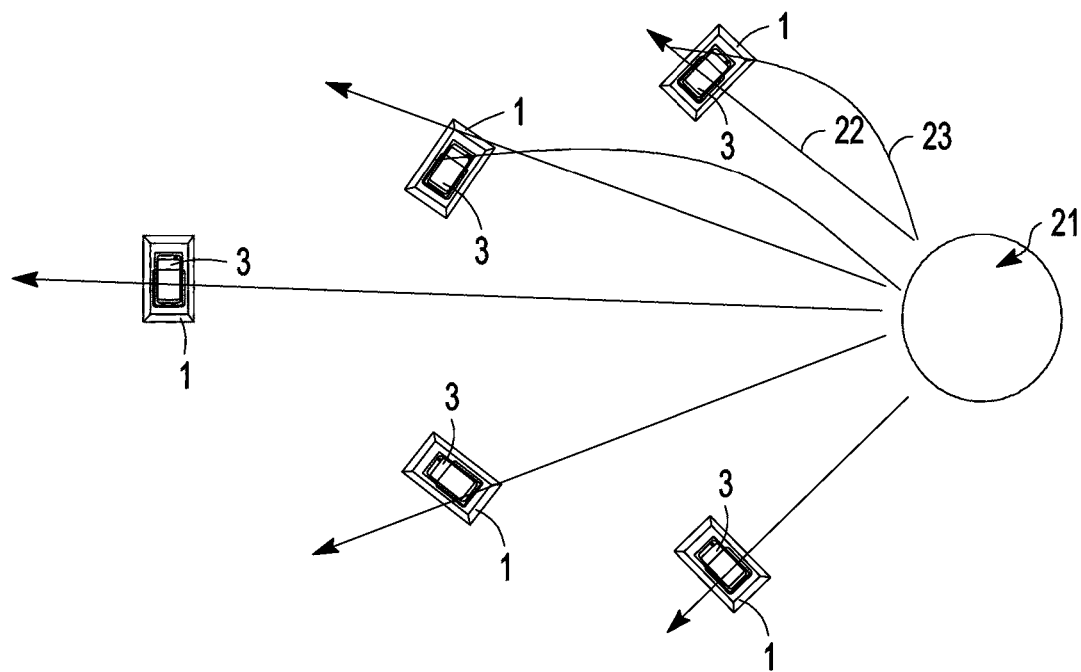
FIG. 16 illustrates a schematic of a training apparatus having a plurality of networked electronic devices in accordance with an embodiment of the present invention.

FIG. 16 illustrates an example of a plurality of smartphones 3 networked together with the application installed on each smartphone 3 to create a practice environment for one or many players practicing the skills.

A ball 21 is used for the skill, which in this illustration is being used for a soccer sequence. It will be appreciated that the field set up could be used for a variety of sports such as handball, ice hockey or grid iron where a ball is thrown rather than kicked at a target, and could include multiple balls, pucks, etc.

Five smartphone holding devices 1 (which act as targets) are shown on the field and could be placed anywhere from 0.5 metres to 100 metres apart. The ball 21 can be kicked in the air on the full, as indicated by motion line 23 to land on a holding device 1 for recording purposes or along the ground as indicated by motion line 22.

The application installed on each smartphone 3 can be interconnected through a network, using Bluetooth, Wi-Fi Direct, cellular technologies or infrared, and the results of one or more users can be recorded across each of the devices.

The application installed on each smartphone 3 can be programmed to have a simple recording of a miss or a hit 24 depending on whether a user has recorded a result within a given time.

A further example would be as follows: 5 balls are used with 5 players and each player has a skill to perform and their results recorded. For example: Player one may be practicing a short pass to the right to the closest smartphone 3 with player 3 hitting a long pass to a smartphone 3 that is 30 metres away.

The data for each player is recorded and the results are available during or after practice. This data can be analysed by coaching staff and players to see their improvement over a period and work on improving their weaknesses.

In another use of the set of networked smartphones 3, one or more players can practice complex training methods and gauge the results of such work. A coach may upload a specific training program to the application for a player, for example, where he wants a certain sequence of passes to targets which is followed up by a strike at goal in a corner of a soccer net.

In doing this one player using the system and smartphone application with 3 training devices could perform the following:

Pass to device;
Run to where the ball would be returned to the player;
Fake a pass to a device but pass to a different device; and
Run to where the ball would be returned to the player and then strike at goal device with a recording net attached.

The application will record the results and give instant feedback by an audio indicator, such as commentary or a sound, or a visual indicator, such as a flashing screen or light, which can be helpful to a player's development.

A smaller version and variation of the apparatus shown in FIG. 16 would be a board for game play with one mobile phone holding device holding multiple phones. This combination of multiple phones can commentate the game and record the results for 1 or more players using their phones with the application installed.

Figure 17:
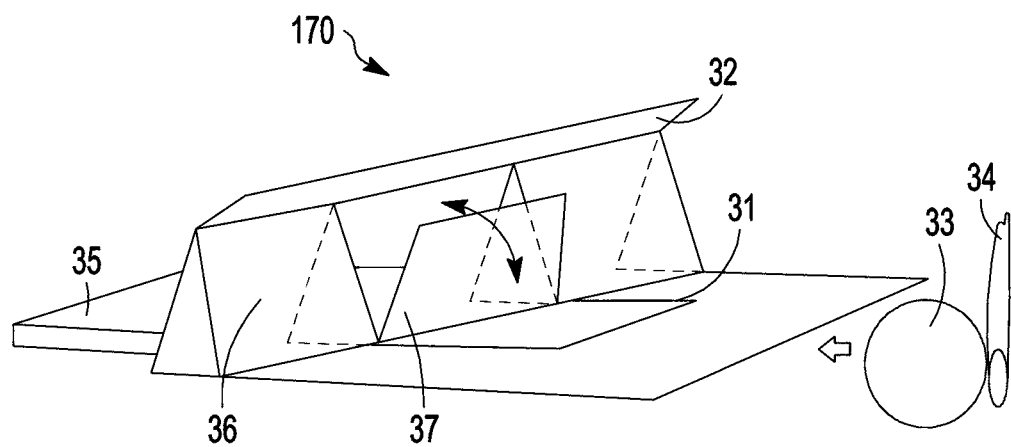
FIG. 17 illustrates a perspective view of a training apparatus having a goal apparatus which acts as a backboard in accordance with an embodiment of the present invention.
Figure 18:
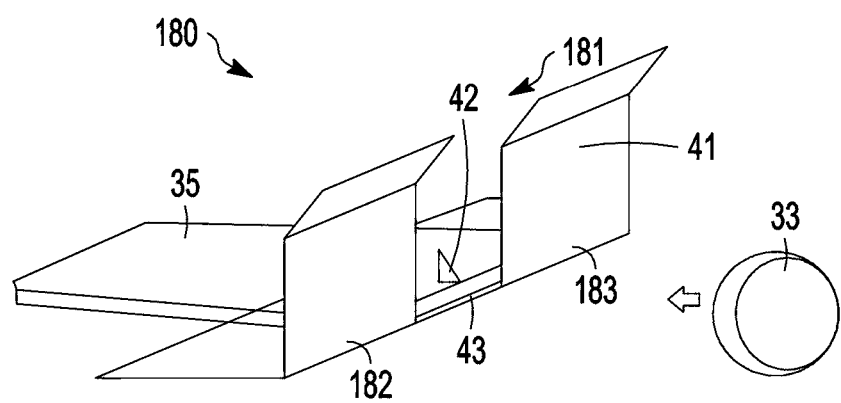
FIG. 18 illustrates a perspective view of a training apparatus having a goal apparatus which also acts as a backboard in accordance with an embodiment of the present invention.
Figure 19:
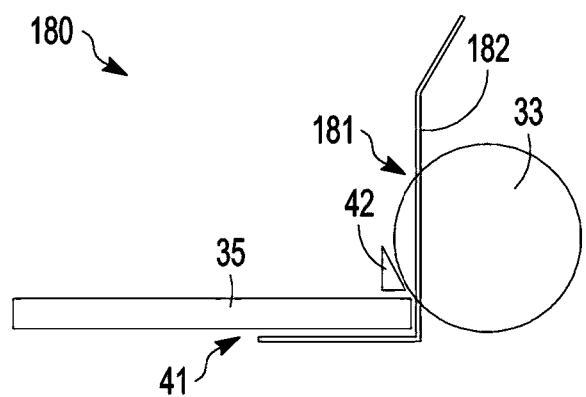
FIG. 19 illustrates a side view of the training apparatus of FIG. 16 in use.

FIG. 17-19 show embodiments of an apparatus as a table top game 170, 180 using a mobile smartphone 35 with a playing device 31, 41 for game play at home or in the backyard or for soccer field training.

The 3 games shown and the apparatus described are for one or more players that are playing on the same side and need the ball to continually return to them after striking the ball into the target.

The apparatus described herein in relation to FIG. 17 described acts as a backboard and target for a ball or similar device.

The device 31 shown in FIG. 17 can be made of paper, cardboard, plastic, metal or any composite material and holds a mobile smartphone 35 securely at its rear end that is shielded by a wall 36 in the front that has an inclined partition 32 at the top to ensure the ball 33 is returned to where it came from and does not roll over the back of the device 31.

The target or goal is a member in the form of a flap 37 at the front of the device 31 that is elevated at a minimum of 45 degrees that comes from the ground and can move forward when struck and trigger the proximity sensor (not shown) of the mobile smartphone 35.

The player, in this embodiment, playing a table top game 170 with mobile smartphone 35 is using his or her finger 34 to move the ball 33 to attempt to record a goal and achieve as many goals as he can within a set time sequence.

As the target is hit, the result is recorded and the game can also be used in a variety of ways such as to record an accurate golf putt or puck strike.

FIG. 18 shows table top game 180 which is a variation of the table top game 170 described above in relation to FIG. 17, where an opening 181 in the vertical walls 182, 183 becomes the target for the game. In order to provide the backboard effect, the opening 181 is only wide enough for a portion of the ball 33 to pass through the opening 181 such that the proximity sensor 42 of the smartphone 35 will be activated but the ball 33 will be reflected back to the player. It will be appreciated that the size of the opening 181 can be varied depending on the size of the ball and the application. For example, for a golf ball the opening would be less than for soccer or basketball.

In the illustrated embodiment, a ball 33 is shown that is aligned to the apparatus 41 that is holding a smartphone 35 with a proximity sensor 42 in position for play.

FIG. 19 shows the table top game 180 of FIG. 18 in use, where the ball 33 enters the opening 181 in the wall 182, 183 to record a goal or successful attempt on the proximity sensor 42 of the smartphone 35 running the installed application for the game. Any ball 33 directed away from the opening 181 which hits the walls 182, 183 or otherwise misses before a certain time period elapses is recorded as a miss.

Figure 20:
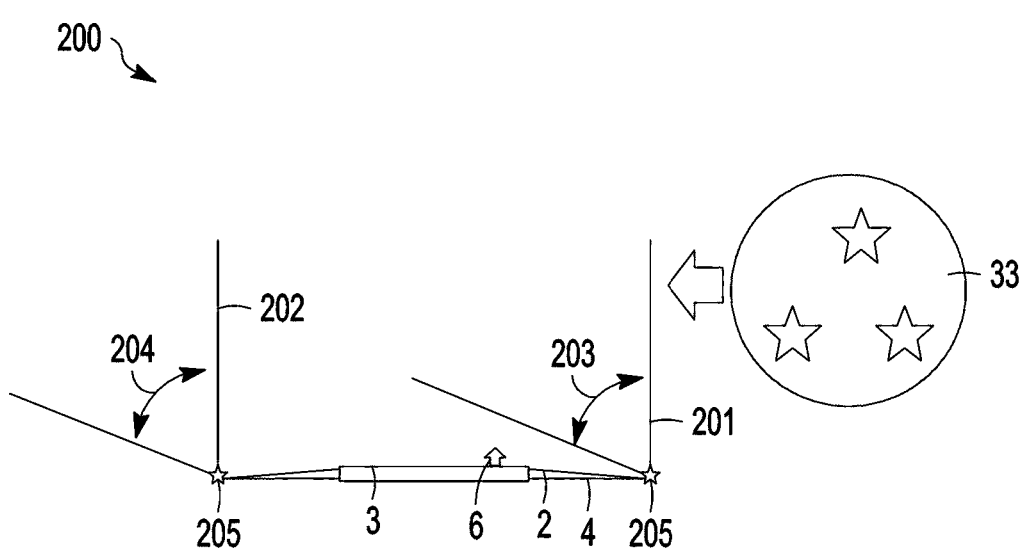
FIG. 20 illustrates a training apparatus having a set of movable goals attached to a playing surface in accordance with an embodiment of the present invention.

FIG. 20 illustrates another form of a training apparatus 200 where there are two opposing goals in the form of resilient members 201, 202 biased to move from a vertical position to a horizontal position when impacted by a ball 33, as indicated by double ended arrows 203, 204. The two resilient members 201, 202 are connected to the base protective apparatus 2 and have a torsion spring 205 (or similar device) to allow the resilient members 201, 202 to move over the proximity sensor 6 to record a goal and then return to the vertical position.

Described below is a simple practice routine or game using the training apparatus described above. Two (2) players would stand either side of the mobile smart phone or Tablet holding device that has a mobile phone installed with the appropriate application for the drill installed and turned on for play. They would use a soccer ball and practice passing to each other across the device for a predetermined time that is loaded into the App program, from 1 to 60 minutes.

As the ball crosses over the top of the proximity sensor within the correct time, The App records every successful hit from the LEFT side or RIGHT side and keeps score. In doing so the players can compete to see who gets the most successful attempts and wins the game. The App assumes that when a score has not been made after a prompt to try and score in a set time period that a MISS has occurred. And can record data such as scoring percentages based on shots taken and goals scored from the results of Hits and Misses recorded.

After 10 minutes the player on the left may have a score of 30, for example, and the player on the right has a score of 28. This creates competition and concentration to perform the skill in a fun way.

The smartphone application can make the game harder and more challenging by providing a set distance that the players must stand apart to pass the ball and a giving a set time to conclude the pass.

By making the game harder the accuracy and speed of the kick needs to be greater and the users skills are enhanced as they practice to achieve the new demands with a resulting increase in the ability level of the player. The two (2 skills of passing accuracy and speed are some of the prerequisite of a master soccer player.

The application installed on the smartphone can analyse results achieved and make the skills harder as the player's ability level improves.

Advantageously, some embodiments of the apparatus can be easily assembled/disassembled and transported. Further advantageously, some embodiments of the apparatus can be set up in a large number of locations allowing a user to practice skills or drills even if a standard sports field and equipment are not available.

In this specification, adjectives such as first and second, left and right, top and bottom, and the like may be used to solely distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step, etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

What is claimed:

1. A training apparatus for teaching and practicing skills for sports comprising:
   at least one removable electronic device having at least one proximity sensor and a display screen;
   at least one playing surface having a cavity which receives the at least one removable electronic device, wherein the cavity has a base, a sidewall connected to and extending from the base and an opening defined by the sidewall;
   a cover that covers a portion of the opening of the cavity of the playing surface and the at least one removable electronic device to protect the display screen of the removable electronic device, wherein the cover does not cover the proximity sensor of the at least one removable electronic device, wherein the cover is clear and allows the display screen to be viewed by a user; and a gamepiece, wherein the at least one proximity sensor is adapted to sense the gamepiece and activates a visual or audio indicator on the at least one removable electronic device if the gamepiece is within a range of the at least one proximity sensor.

2. The training apparatus of claim 1, further comprising:
at least one vertical support member;
a horizontal mounting member extending from the vertical support member; and
a movable member attached to the horizontal mounting member, wherein an end of the movable member is adjacent the proximity sensor of the electronic device, wherein the at least one proximity sensor senses the movable member and activates a visual or audio indicator if the gamepiece moves the movable member.

3. The training apparatus of claim 1, the at least one playing surface having at least one bevelled edge.

4. The training apparatus of claim 3, wherein an angle of the bevelled edge is between 35° to 45°.

5. The training apparatus of claim 1, the playing surface having at least one member biased to extend vertically from the playing surface.

6. The training apparatus of claim 5, wherein the at least one member is configured to move to a horizontal position which activates the proximity sensor of the removable electronic device when the gamepiece contacts the member.

7. The training apparatus of claim 1, further comprising two or more playing surfaces and two or more removable electronic devices, each playing surface having one or more cavities for receiving one of the removable electronic devices.

8. The training apparatus of claim 7, wherein the two or more removable electronic devices are networked.

9. The training apparatus of claim 8, wherein the two or more removable electronic devices are networked using wireless local area network, Bluetooth, infrared or a cellular network.

10. The training apparatus of claim 9, wherein the two or more removable electronic devices wirelessly communicate proximity sensor data to each other.

11. The training apparatus of claim 1, wherein the proximity sensor of each removable electronic device is an infrared proximity sensor.

12. The training apparatus of claim 2, wherein a second movable member is attached to the horizontal mounting member and an end of each of the movable members is located on opposite sides of and adjacent to the proximity sensor.

13. The training apparatus of claim 1, wherein upon sensing the gamepiece in the range of the at least one proximity sensor, the removable electronic device calculates a score.

14. The training apparatus of claim 1, the playing surface having a securing device for securing the playing surface to a surface.

15. The training apparatus of claim 1, each removable electronic device having two or more proximity sensors.

16. The training apparatus of claim 1, wherein each removable electronic device is one of a smartphone, tablet computer or dedicated proximity detecting device.

17. The training apparatus of claim 1, the apparatus further comprising a wall extending vertically from an edge of the playing surface, the wall having an opening for allowing a gamepiece to pass through the opening.

18. A training apparatus for teaching and practicing skills for sports, comprising:
a smartphone having at least one proximity sensor and a display screen;
a smartphone holding apparatus having a cavity which receives the smartphone, wherein the cavity has a base, a sidewall connected to and extending from the base and an opening defined by the sidewall;
a cover that covers a portion of the opening of the cavity of the smatphone holding apparatus and the smartphone to protect the display screen of smartphone, wherein the cover does not cover the proximity sensor of the smartphone, wherein the cover is clear and allows the display screen to be viewed by a user; and
a gamepiece,
wherein the at least one proximity sensor is adapted to sense i) the gamepiece if the gamepiece is within a range of the at least one proximity sensor or ii) a movable proximity sensor activator if the gamepiece moves the proximity sensor activator, and activates a visual or audio indicator on the smartphone.

19. The training apparatus of claim 18, wherein the proximity sensor of the smartphone is an infrared proximity sensor.

20. The training apparatus of claim 18, wherein upon sensing the gamepiece or proximity sensor activator in the range of at least one proximity sensor, the smartphone calculates a score.

21. A method for teaching and practicing skills for sports with the training apparatus according to claim 1, the method comprising the steps of:
inserting the at least one removable electronic device having the at least one proximity sensor into the cavity of a playing surface;
actuating the gamepiece to activate the visual or audio indicator on the at least one removable electronic device if the gamepiece is sensed by the proximity sensor within a range of the at least one proximity sensor.

22. The method of claim 21, further comprising the step of calculating a score via the removable electronic device upon sensing the gamepiece in the range of the at least one proximity sensor.

* * * * *